United States Patent Office 2,776,257
Patented Jan. 1, 1957

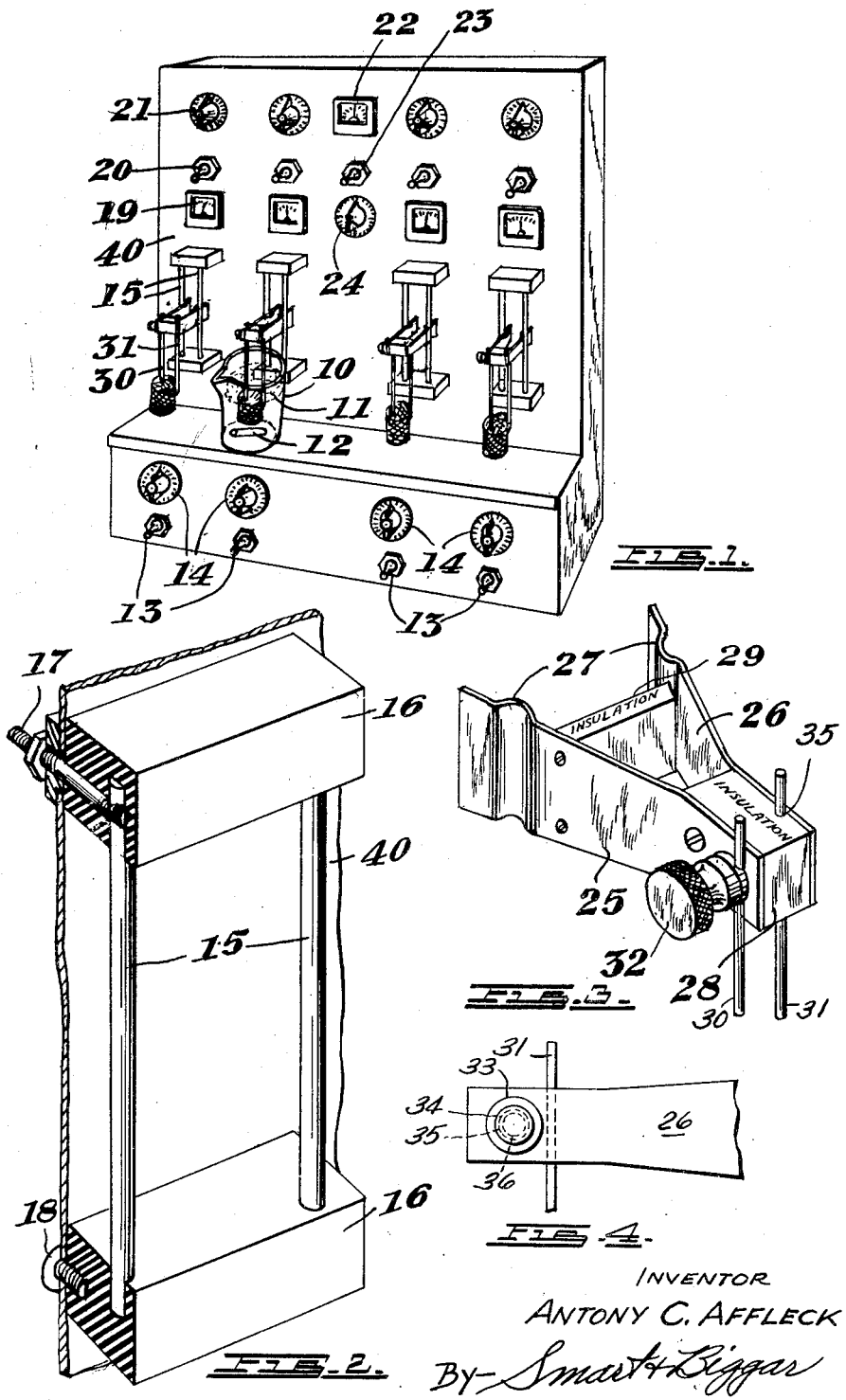

2,776,257
APPARATUS FOR ELECTROCHEMICAL ANALYSIS

Antony Cyril Affleck, Vancouver, British Columbia, Canada, assignor, by mesne assignments, to Canadian Patents and Development Limited, Ottawa, Ontario, Canada Application August 23, 1954, Serial No. 451,463

3 Claims. (Cl. 204—195)

This invention relates to apparatus for electrochemical analysis and is particularly concerned with an improved arrangement for supporting the electrodes used in such apparatus.

In apparatus for electrochemical analysis it is customary to provide a vertical frame having a horizontal shelf upon which vessels containing the electrolyte may be seated. Provision is made for inserting in each vessel a pair of electrodes supported from the vertical frame, and each vessel is seated above a motor driven magnet, the arrangement being such that magnetic force from the magnet extends into the vessel. A short length of iron wire or a permanent magnet encased in glass or plastic is placed in each vessel so that rotation of the magnets causes rotation of each piece of iron wire, thereby stirring the electrolyte.

There has been a need for improved means for supporting the electrodes. None of the known arrangements provides for ease of adjustment of the position of the electrodes while at the same time permitting their removal in a simple manner and protecting the required electrical contacts from corrosion caused by splashing of the electrolyte as normally occurs in such apparatus.

According to the present invention the electrodes are supported from two horizontally extending, spaced apart, electrically conducting plates of spring material. The plates are arranged to be supported in their horizontal position from two vertically extending, spaced apart, electrically conducting rods which are held in position by the vertical frame of the apparatus. Each of the plates near one end is grooved in a vertical direction to fit against the side of one of the rods, and each of the plates at the other end is fixed to the other plate but insulated electrically therefrom and spaced therefrom so that when the plates are sprung the grooves in the plates grip the rods thereby supporting the plates from the rods.

With an electrode holder in accordance with the invention the operator of the apparatus can remove the holder and the electrodes from the vertical support member by grasping the holder in one hand, squeezing the plates together and removing them from the vertically extending rods. The electrodes may be raised or lowered by sliding the plates of the electrode holder up or down while applying some pressure to them by hand. This permits adjusting the height of the electrodes or replacing the vessel of electrolyte.

Electrical connection to the electrodes in apparatus in accordance with the present invention is made through the spring plates and the vertically extending rods which are supported from the vertical frame of the apparatus. Solid electrical connections can be made from the vertically extending rods to the source of voltage within the apparatus which makes it possible to construct the vertical frame of the apparatus from a sheet of stainless steel having no exposed openings through which electrolyte might splash. In this way the electrical connections within the apparatus can be protected from corrosion.

In a preferred form of the apparatus each of the spring plates of the electrode holder is grooved inwardly toward the other plate and an insulating block is fixed to the inner side of one of the plates so as to extend toward the other plate to act as a stop block to limit movement of one plate toward the other. This prevents elastic deformation of the plates while permitting them to be pressed together sufficiently so that the grooves in the plates may be put into or out of engagement with the rods.

The invention will be further described with reference to the accompanying drawings in which—

Figure 1 is a perspective view of apparatus for electrochemical analysis in accordance with the invention;

Figure 2 is a perspective view of the vertically extending rods from which each electrode holder is supported;

Figure 3 is a perspective view of an electrode holder in accordance with the invention; and Figure 4 is a partly sectional view of an electrode holder in accordance with the invention.

The arrangement of the panels and of the equipment behind the panels in the apparatus shown in Figure 1 is conventional in design and therefore it will not be described in detail. The apparatus shown has four positions at which electrochemical analysis may be carried out but there may be any given number of positions. A glass beaker 10 is shown in one of the positions and when the other positions are in use they would be similarly equipped with glass beakers. The glass beaker 10 contains an electrolyte 11 and a stirring member 12 which may comprise a short length of iron wire or a permanent magnet sealed in a glass or plastic tube. Beneath the glass beaker 10 is a motor driven magnet which is controlled by a switch 13 and a rheostat 14. This arrangement for magnetic stirring of the electrolyte is well known and is described in United States Patent 2,566,676, A. T. Rabbitts, September 4, 1951.

As shown in Figures 1 and 2, a pair of vertically extending, spaced apart, electrically conducting rods 15 at each of four positions, is supported from a vertical panel 40 of the apparatus by a pair of blocks 16 of insulating material held to the panel 40 by studs 17 and 18. As shown in Figure 2, each of the studs 17 extends through the insulating block 16 and is threaded into a rod 15 so as to make electrical contact therewith. As shown in Figure 1, an ammeter 19, a switch 20 and a rheostat 21 are provided above each of the four positions for use in controlling the electric current supplied to each position. In the centre of the vertical panel 40 is a voltmeter 22, an off-on switch 23, and a voltage control 24. Both the current and voltage controls are the ones which are usually supplied on such apparatus and their construction and circuits are well known in the art. The current metered by each ammeter 19 is supplied to the corresponding pair of rods 15.

An electrode holder as shown in Figure 3 is provided for each of the four positions of the apparatus shown in Figure 1. The electrode holder comprises two horizontally extending, spaced apart, electrically conducting plates 25 and 26 of spring material, each of the plates 25 and 26 near one end having a groove 27 extending in a vertical direction and of a shape suited to fit against the side of a rod 15 in the manner shown in Figure 1. The other end of each of the plates 25 and 26 is fixed to the other plate and spaced therefrom by a block 28 of electrically insulating material, the spacing of the plates 25 and 26 being such that the plates can be sprung toward each other, inserted between a pair of rods 15 and released so that the grooves 27 bear against the inner surfaces of the rods 15 thereby supporting the electrode holder while each plate 25 and 26 makes electrical contact with a rod 15. As shown in Figure 3, a stop block 29 of electrically insulating material is fixed to the plate 25 and extends toward the plate 26 to act as a stop to limit movement of one plate toward the other thereby preventing elastic deformation of the plates. Although it is considered advisable to use a stop block 29 it is not essential to the operation of the apparatus in accordance with the invention.

The two electrodes 30 and 31 are of conventional construction. The electrode 30 is held in electrical contact with the plate 25 by the thumb screw 32. A stud 36 passes through the electrical-insulating washer 33 which covers the opening 35 in the plate 26. The stud 36 is threaded into the thumb screw 32. When the thumb screw 32 is tightened, the end 34 of the stud 36 holds the plate 26 firmly against the insulating block 28. The electrode 31 is placed in the opening 35' in the insulating block 28. This opening opens onto the plate 26. Consequently the plate 26 firmly holds the electrode 31 in place and is in electrical connection therewith. In operation a glass beaker containing electrolyte may be placed at each of the four positions, and an electrolyte holder as shown in Figure 3 equipped with a pair of electrodes may be conveniently attached to each pair of rods 15 by merely grasping the plates 25 and 26 in one hand, pressing the plates together and inserting them between the rods 15 and releasing them so that the grooves 27 bear against the rods 15. In a similar manner the height of the electrodes 30 and 31 can be adjusted by sliding the electrode holder up or down along the rods 15. Current is supplied to the electrodes 30 and 31 from a source within the apparatus and is indicated and controlled by the ammeter 19, the switch 20 and the rheostat 21. The current is supplied to the electrodes 30 and 31 through the studs 17 (Figure 2), the rods 15, and the plates 25 and 26. With this arrangement only fixed type of electrical connections are required through the panel of the apparatus and therefore there are no exposed openings in the panel through which electrolyte might splash and cause corrosion of the electrical contacts or the equipment behind the panel. Preferably the panels of the apparatus and the horizontally extending shelf are made of stainless steel which is resistant to corrosion.

What I claim as my invention is:

1. Apparatus for electrochemical analysis comprising; a vertical support panel; two vertically spaced apart electrical-insulating support members extending from the panel; two spaced apart electrical-conducting rods fixed between the support members in spaced apart relation to the panel; two spaced apart electrical conducting plates of spring material, a groove formed in each plate near one edge in a vertical direction, each groove being held into slidable engagement with one of the rods by the spring action of each plate, an electrical-insulating block fixed to the opposite edge to said one edge of each plate and holding the plates for spaced relation; two vertically extending electrodes; means for normally holding one of the electrodes in electrical contact with one plate and the other electrode in electrical contact with the other plate; the electrodes being adapted to extend into a vessel; means for supplying an electrical potential between said rods.

2. Apparatus as claimed in claim 1 wherein the groove in each plate protrudes inwardly towards the other plate; a second block of electrically insulating material being attached to one of the plates near its groove and extending a substantial distance towards the other plate, whereby the movement of one plate towards the other is limited thereby preventing elastic deformation of the plates while permitting them to be pressed together sufficiently so that the grooves in the plate may be put into slidable engagement with said rods.

3. An electrode holder comprising two spaced apart, electrically conducting plates of spring material; each of said plates near one edge having a linear groove running parallel to that in the other plate; each of said plates being fixed to the other plate near an edge remote from said groove, insulated electrically therefrom and spaced therefrom; and means for connecting an electrode to each of said plates near said edge remote from said groove, a substantially rigid block of electrical insulating material fixed to one of the plates and extending for part only of the normal distance between the two plates to act as a stop block to limit movement of one plate towards the other thereby preventing elastic deformation of the plate.

References Cited in the file of this patent
UNITED STATES PATENTS

| | | |
|---|---|---|
| 1,715,411 | Di Cesare | June 4, 1929 |
| 1,804,474 | Martin | May 12, 1931 |
| 2,390,852 | Stee | Dec. 11, 1945 |